United States Patent [19]

Shirasaki

[11] Patent Number: 4,712,880
[45] Date of Patent: Dec. 15, 1987

[54] POLARIZATION ROTATION COMPENSATOR AND OPTICAL ISOLATOR USING THE SAME

[75] Inventor: Masataka Shirasaki, Kawasaki, Japan

[73] Assignee: Fujitsu Limited, Kawasaki, Japan

[21] Appl. No.: 900,246

[22] Filed: Aug. 25, 1986

Related U.S. Application Data

[63] Continuation of Ser. No. 508,547, Jun. 28, 1983, abandoned.

[30] Foreign Application Priority Data

Jun. 28, 1982 [JP] Japan ................ 57-109912
Jun. 28, 1982 [JP] Japan ................ 57-111013

[51] Int. Cl.$^4$ .................... G02F 1/09; G02B 27/28
[52] U.S. Cl. ........................ 350/377; 350/405
[58] Field of Search ............ 350/375, 377, 403, 405

[56] References Cited

U.S. PATENT DOCUMENTS

| | | | |
|---|---|---|---|
| 4,129,357 | 12/1978 | Title | 350/157 |
| 4,178,073 | 12/1979 | Uchida et al. | 350/377 |
| 4,375,910 | 3/1983 | Seki | 350/403 |

FOREIGN PATENT DOCUMENTS

| | | | |
|---|---|---|---|
| 0054411 | 6/1982 | European Pat. Off. | |
| 1908409 | 6/1970 | Fed. Rep. of Germany | |

OTHER PUBLICATIONS

Jerrard, H. G., "Transmission of Light Through Birefringent & Optically Active Media: The Poincare Sphere", Jr. Optical Soc. America, 8-1954, pp. 634-640.
Matsuura et al, "Measurement of Optical Phase Difference Using a Polarization Technique", Optics & Laser Technology, 12-1977, p. 2859.
Williamson et al, "New High-Precision Photoelectric Universal Polarimeter & Birefringence Compensator", Jr. Optical Soc. Am., 3-1964, pp. 337-341.
Matsumoto, T., "Polarization-Independent Isolators for Fiber Optics", Electronics & Communications in Japan, vol. 62-C, #7, 1979, pp. 113-118.
Bennett et al, "Polarization", Section 10 of Handbook of Optics, Driscoll et al, editors, McGraw-Hill 1978, pp. 10-25 & 10-139-140, 10-103-10-106..
M. Shirasaki et al, "Bistable Magnetoptic Switch for Multimode Optical Fiber", Applied Optics, vol. 21, No. 11, Jun. 1, 1982, pp. 1943-1949, New York, US.

*Primary Examiner*—William H. Punter
*Attorney, Agent, or Firm*—Staas & Halsey

[57] ABSTRACT

A polarization rotation compensator and an optical isolator using the same are described. The optical isolator comprises a first birefringent wedge plate; a polarization rotation compensator composed of a combination of a half-wave plate whose principal axis is inclined at an angle of $\theta/2$ with respect to the plane of polarization of the incident light and a quarter-wave plate whose principal axis is inclined at an angle of $\theta$ with respect to the plane of polarization of the incident light; a Faraday rotator; and a second birefringent wedge plate; wherein the Faraday rotator, quarter wavelength plate, and half-wavelength plate are respectively arranged in the order of propagation of the backward light or of the forward light.

11 Claims, 9 Drawing Figures

POLARIZATION ROTATION COMPENSATOR AND OPTICAL ISOLATOR USING THE SAME

This is a continuation of co-pending application Ser. No. 508,547 filed on June 28, 1983, now abandoned.

BACKGROUND OF THE INVENTION

The present invention relates to a polarization rotation compensator and to an optical isolator using the polarization rotation compensator. More particularly, it relates to a polarization rotation compensator which is capable of rotating a plane of polarization by a desired angle when linearly polarized light is passed therethrough, and which is and capable also of compensating for deviations in the polarizing angle due to deviations of the optical wavelength in the incident ray and due to the effect of an optical isolator which is not dependent on the wavelength change in the incident ray.

As is well known, a rotator used in an optical device such as an isolator for optical communication at a wavelength of 1.30 μm (microns), for example, has a wavelength dependency. In an optical isolator, for example, when linearly polarized light passes through a 45-degree Faraday rotator, a plane of polarization rotated 45 degrees about the direction of propagation thereof can be obtained. However, this is possible only for light having a predetermined wavelength. Deviation in the wavelength of the light causes the polarizing angle of the plane of polarization to deviate, resulting in deterioration of the isolation effect of the isolator.

Crystal quartz, polarization rotation compensator which correct deviations in the optical rotating angle of a plane of polarization due to wavelength deviations are well known in the art.

However, although a crystal quartz, polarization rotation compensator whose principal axis is parallel to the propagating light can correct deviations in the optical rotating angle, they are large, having a length, for example, of 10 mm to 15 mm along the optical axis when they are used for the long wavelength above.

SUMMARY OF THE INVENTION

It is one object of the present invention to provide a small polarization rotation compensator that reduces the wavelength dependency of a Faraday rotator at a desired angle of polarization.

It is another object of the present invention to provide an isolator that uses a polarization rotation compensator and has no wavelength dependency.

According to the present invention, there is provided a polarization rotation compensator comprising a combination of a half-wave plate, whose principal axis is inclined at an angle of $\theta/2$ with respect to the plane of polarization of the incident light, and a quarterwave plate whose principal axis is inclined at an angle of $\theta$ with respect to plane of polarization of the incident light when the half-wave plate and the quarter-wave plate are disposed in this order to the propagating light, or a combination of a quarterwave plate, whose principal axis is parallel to the plane of polarization of the incident light, and a half-wave plate, whose principal axis is inclined at an angle of $\theta/2$ with respect to the plane of polarization of the incident light, in this order.

Furthermore, there is provided an optical isolator comprising a first birefringent wedge plate; a polarization rotation compensator comprising a combination of a half-wave plate, whose principal axis is inclined at an angle of $\theta/2$ with respect to the polarization plane of the incident light, and a quarterwave plate, whose principal axis is inclined at an angle of $\theta$ with respect to the polarization plane of the incident light, in this order; a Faraday rotator; and a second birefringent wedge plate; wherein the Faraday rotator, quarter-wavelength plate, and half-wavelength plate are arranged in the recited order with respect to the direction of propagation of the backward light. Furthermore, there is provided: an optical isolator comprising a first birefringent wedge plate; a polarization rotation compensator comprising a combination of a quarter-wave length plate, whose principal axis is parallel to the plane of polarization of the incident light, and a half-wave length plate whose principal axis is inclined at an angle of $\theta/2$ with respect to the plane of polarization of the incident light, in this order; a Faraday rotator; and a second bire-fringent wedge plate; wherein the half-wavelength plate, quarter-wavelength plate and Faraday rotator are arranged in the order of propagation of the backward light.

BRIEF DESCRIPTION OF THE DRAWINGS

Further advantages and details of the present invention will become apparent through reference to the accompanying drawings, in which.

DESCRIPTION OF THE PREFERRED EMBODIMENTS

Before explaining the preferred embodiments of the invention, a description will be made of the prior art for reference.

Figure 1A:
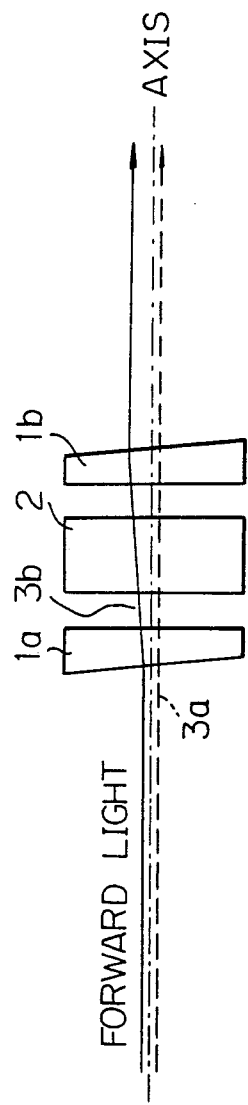
FIGS. 1A and 1B are cross-sectional views of a conventional isolator.
Figure 1B:
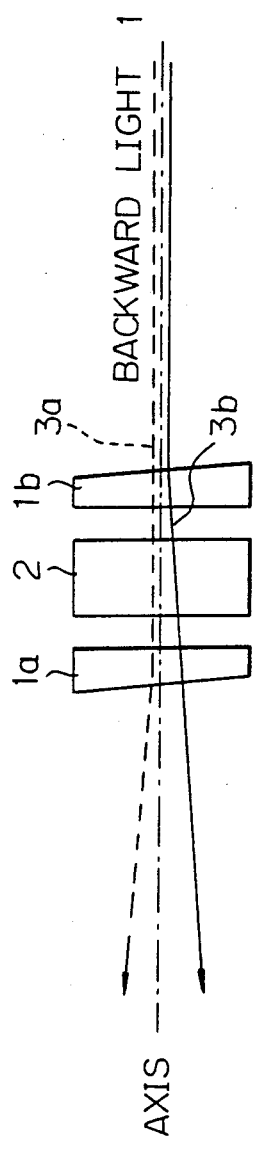

An isolator using tapered birefringent wedges, as shown in FIGS. 1A and 1B have previously been proposed U.S. Ser. No. 329,940, now U.S. Pat. No. 4,548,478. In FIGS. 1A and 1B, birefringent wedges 1a and 1b are placed at the front and back of a Faraday rotator 2 formed of a single crystal of yttrium-iron-garnet (YIG). The birefringent wedge 1a refracts the ordinary and the extraordinary rays 3a and 3b at different angles. The Faraday rotator 2 rotates the plane of polarization 45 degrees. Since the Faraday rotation is dependent on the wavelength of the incident light, the wavelength region over which 45-degree rotation can be obtained is very narrow.

Figure 2:
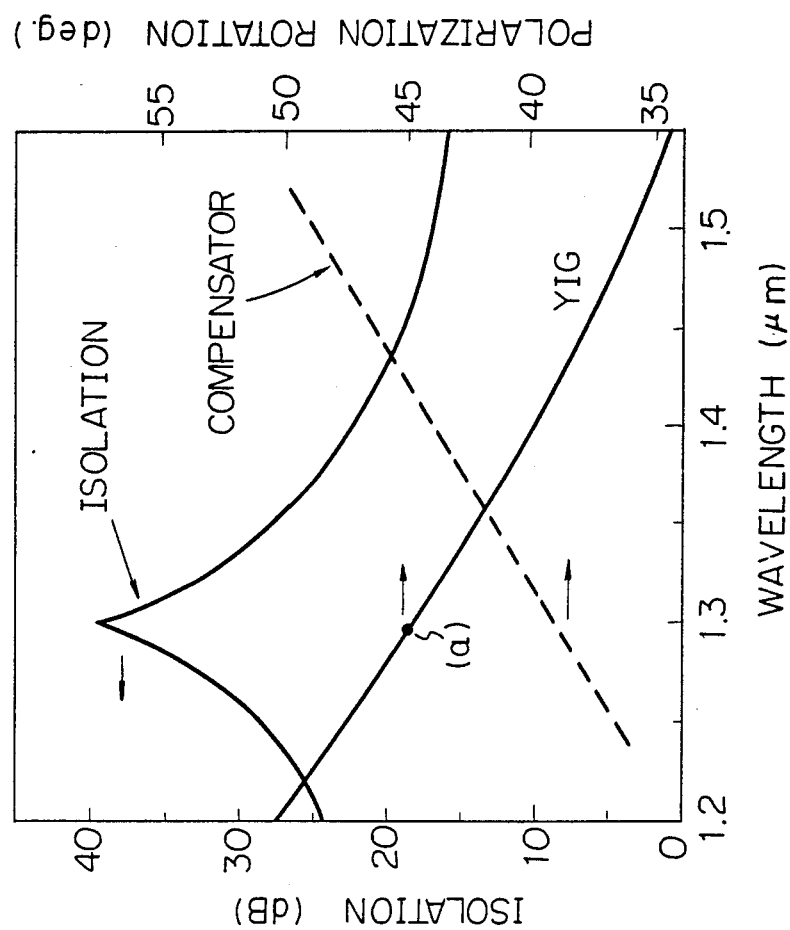
FIG. 2 is a graph of the wavelength (μm) in relation to the isolation (dB) and polarization rotation (deg)

As shown in FIG. 2, the isolation is highest at a wavelength of 1.3 μm when the Faraday rotator (YIG) is adjusted such that the polarization is rotated 45 degrees at a wavelength of 1.3 μm (a). When the wavelength is shorter or longer than 1.3 μm, the isolation level rapidly decreases. The effect of the compensation is also shown in FIG. 2.

Figure 3:
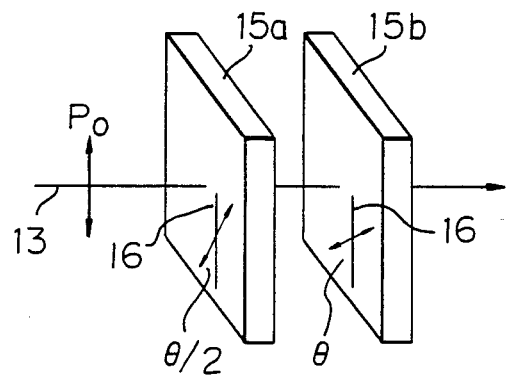
FIG. 3 is a perspective view of an example of a polarization rotation compensator according to the present invention.

FIG. 3 shows an example of a polarization rotation compensator according to the present invention when the compensator is arranged at the front of the Faraday rotator. The compensator comprises a half-wave plate 15a and a quarter-wave plate 15b. The half-wave plate 15a is inclined at an angle of $\theta/2$, and the quarter-wave plate 15b is inclined at an angle of $\theta$, with respect to the vertical axis 16. Reference character 13 indicates the axix of propagation.

Figure 4:
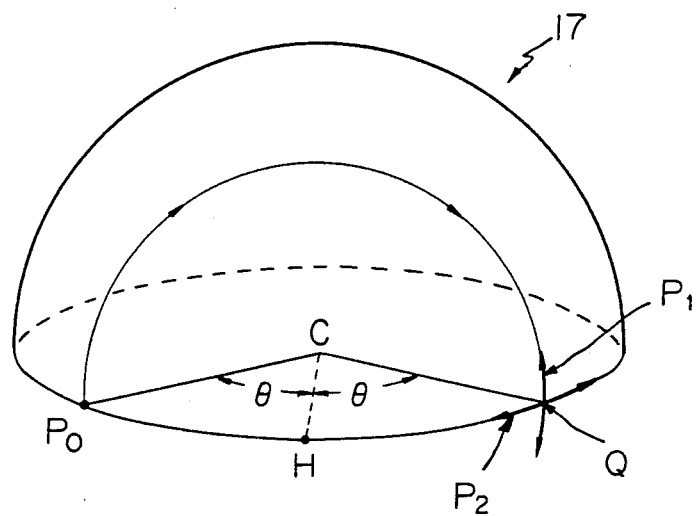
FIG. 4 is a diagram of the principle of operation of the polarization rotation compensator shown in FIG. 3 using a Poincare sphere.

The principle of operation of the polarization rotation compensator can be illustrated by the Poincare sphere 17 shown in FIG. 4. In the Poincare spherical representation, linearly polarized light is indicated by the meridian, circularly polarized light is indicated by the poles, and elliptically polarized light is indicated by the other part of the spherical surface. Incident linear polarization having a wavelength for instance of a 1.4 $\mu$m is transformed from the $P_0$ state to the Q state by the half-wave plate 15a, whose principal axis lies in the H direction i.e., the angle between the principal axis and the polarization plane of the incident light is $\theta/2$ degree. Namely, the half-wave plate 15a rotates the $P_0$ state clockwise about H half a revolution to $P_1$.

When the wavelength of the incident light deviates from 1.4 $\mu$m, the state is distributed on the curve $P_1$ according to the wavelengths. The polarization state on the curve $P_1$ is transformed into the states distributed on the curve $P_2$ by the quarter-wave plate 15b, whose principal axis lies in the Q-direction, i.e., the angle between the principal axis and the polarization plane of the incident light is $\theta$. Namely, the quarter-wave plate 15b rotates the polarization states distributed on the curve $P_1$ clockwise about a quarter of a revolution to the states distributed on the curve $P_2$. The curve $P_2$ can be regarded as the equatorial circle, but strictly speaking, there is a negligible small second order level deviation according to the wavelength.

Consequently, nearly linear polarization is passed through the polarization rotation compensator. Any deviation by the Faraday rotator of the polarization rotation from 45 degrees is proportional to the deviation of the wavelength from 1.4 $\mu$m.

Figure 5A:
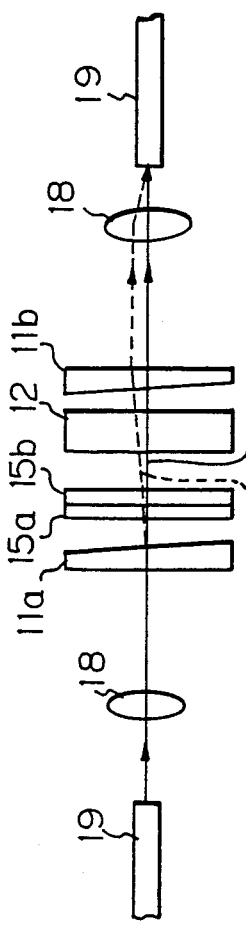
FIGS. 5A, 5B and 5C are schematic views of an example of an isolator according to the present invention.
Figure 5B:
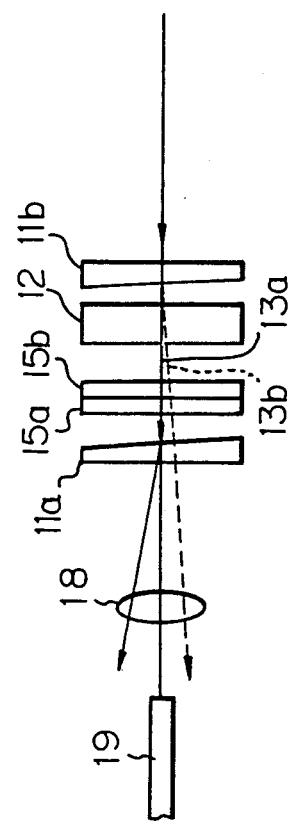
Figure 5C:
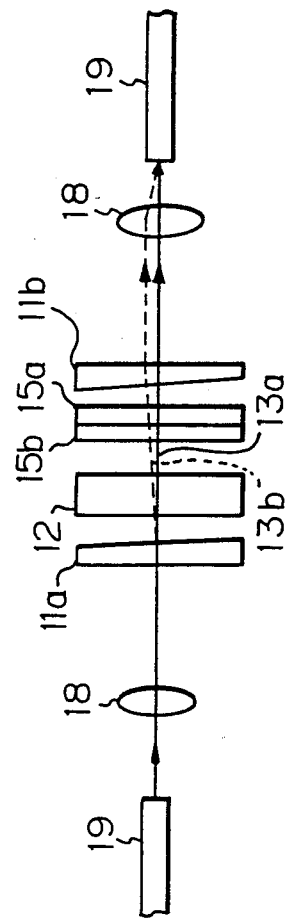

FIGS. 5A and 5B show an example of an optical isolator for use with single-mode fibers and FIG. 5C shows another arrangement. This isolator comprises a first birefringent wedge 11a, the above-mentioned polarization rotation compensator composed of the half-wave plate 15a and the quarter-wave plate 15b, a Faraday rotator formed, for example, of a single crystal of YIG, and a second birefringent wedge 11b. The first and second birefringent wedges 11a, 11b together form a polarizing component. The present optical isolator is designed to maintain a high isolation over a wavelength region of 1.3 $\mu$m to 1.5 $\mu$m. Accordingly, all components are designed with a center wavelength of 1.4 $\mu$m.

The isolator shown in FIG. 5A works as follows. Incident light from a fiber 19 on the left enters the birefringent wedge 11a through a lens 18 on the left. The birefringent wedge 11a refracts the ordinary ray 13a and the extraordinary ray 13b at different angles, following which these pass through the above-described polarization rotation compensator composed of the half-wave plate 15a whose principal axis is inclined at an angle of $\theta/2$ with respect to the plane of polarization of the incident light, and the quarter-wave plate 15b whose principal axis is inclined at an angle of $\theta$ with respect to the plane of polarization of the incident light, each formed from a single quartz crystal, and on to the Faraday rotator 12. The Faraday rotator 12 rotates the plane of polarization 45 degrees. Since the Faraday rotation depends on the wavelength, the wavelength region that gives the 45-degree rotation is very narrow. This makes it possible to maintain a high isolation only in a very limited wavelength region, unless deviation from 45-degree rotation is compensated for. A polarization rotation compensator is used in the present isolator in order to broaden the wavelength region over which a high isolation can be maintained. After passing through the Faraday rotator 12, the ordinary and extraordinary rays enter the second birefringent wedge 11b, through which they pass parallel to each other. They are then condensed to the left-hand fiber 19 through the left-hand lens 18.

As explained above, in FIGS. 3 and 4, nearly linearly polarized light is passed through the polarization rotation compensator, and the deviation of the polarization rotation from 45 degrees is proportional to the wavelength deviation from 1.4 $\mu$m.

These deviations in the polarization rotation are summed for the forward-moving light (as indicated in FIG. 5A) and cancelled for the backward-moving light with respect to the incident light (as indicated in FIG. 5B). However, low forward loss is maintained in the broad wavelength, as the forward loss is insensitive to the polarization rotation.

When the light propagates in the forward direction (from the left to the right in FIG. 5A), the ordinary and extraordinary rays in the left birefringent wedge 11a are respectively transformed into extraordinary and ordinary rays, respectively, by the birefringent wedge 11b and refraction by these wedges is cancelled out. On the other hand, when the light propagates in the backward direction as shown in FIG. 5B, the ordinary and extraordinary rays at the right birefringent wedge 11b are respectively transformed into the extraordinary and ordinary rays at the left birefringent wedge 11a, and refractions by these wedges are not cancelled out.

A further optical isolator as shown in FIG. 5C works as follows. Incident light from a fiber 19 enters the birefringent wedge 11a through a lens 18. The birefringent wedge 11a refracts the ordinary ray 13a and the extraordinary ray 13b at different angles, following which these pass through the Faraday rotator 12. The Faraday rotator 12 rotates the plane of polarization 45 degrees, and the emerged rays from the Faraday rotator 12 pass through the above-described polarization rotation compensator composed of the quarter-wave plate 15b, whose principal axis is parallel to the plane of the polarization of the emerged light from the Faraday rotator 12, and a half-wave plate 15a whose principal axis is inclined at an angle of $\theta/2$ with respect to the plane of polarization of the emerged light from the Faraday rotator 12. After passing through the polarization rotation compensator, the ordinary and extraordinary rays enter the second birefringent wedge 11b, through which they pass parallel to each other. They are then condensed to the fiber 19 on the right through the lens 18 on the right.

When the light propagates in the forward direction (from the left to the right in FIG. 5C), the ordinary and extraordinary rays in the left birefringent wedge 11a are respectively transformed into ordinary and extraordinary rays by the right birefringent wedge 11b, and the refractions by these wedges of the ordinary and extraordinary rays are cancelled out. The light rays in the input optical fiber, and of the parallel rays emerging from the wedge 11b, are parallel to the axis of the lenses. The forward moving light (left to right) is thusly coupled to the output fiber 19 on the right, but the backward moving light is not coupled to the fiber 19 on the left, due to the effect as explained for FIG. 5B. That is, when the light propagates in the backward direction, the ordinary and extraordinary rays of the right birefringent wedge 11b are respectively transformed into the extraordinary and ordinary rays at the left birefringent wedge 11a, and the respective refractions by the wedges of the ordinary and extraordinary rays are not cancelled out.

Figure 6:
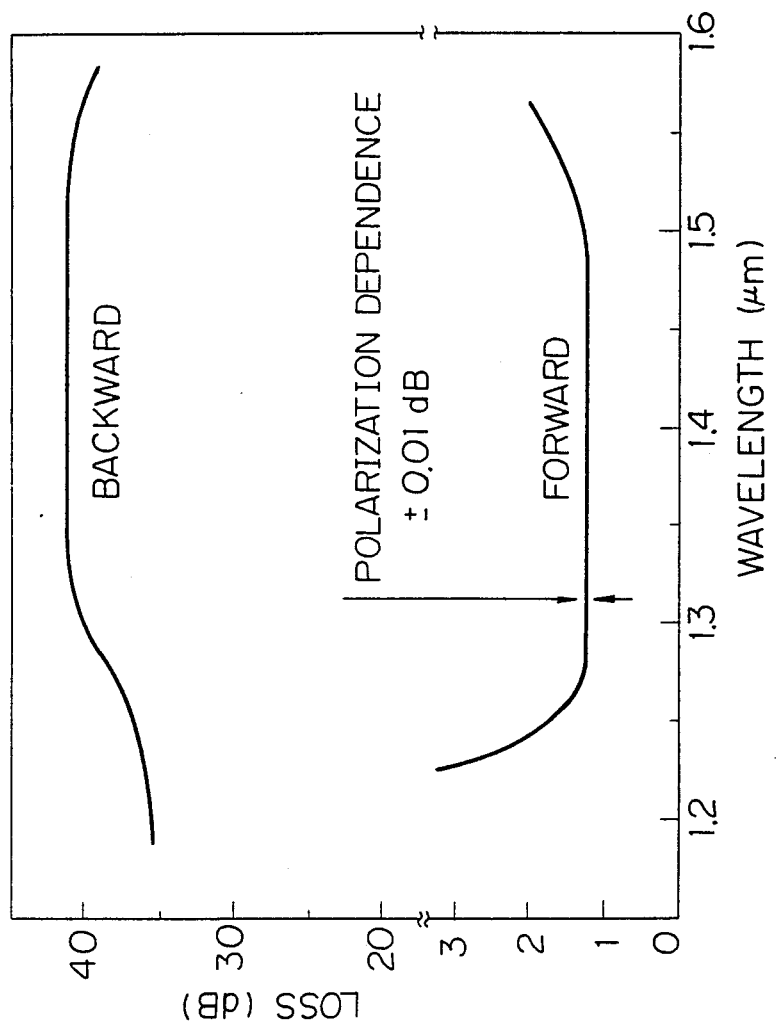

The present optical isolator gives an improved isolation, as shown in FIG. 6. Namely, high isolation of approximately 40 dB can be obtained for the backward-moving light in the wavelength region of 1.3 to 1.5 μm. An isolation value of 40 dB could previously be obtained only at a wavelength of 1.3 μm, as shown in FIG. 2.

The present isolator therefore is not dependent upon the wavelength. As explained above, the present polarization rotation compensator is composed of two coupled wavelength plates having thicknesses of 30 to 100 μm and diameters of 3 to 5 mm, enabling the sizes of the compensator and the present optical isolator to be reduced.

It is preferable that the half-wave plate and quarter-wave plate each be formed from a single quartz crystal. The polarization rotation compensator should preferably range from 30 μm to 100 μm in thickness, and from 3 mm to 5 mm in diameter.

Furthermore, it is desirable that the first and second birefringent wedges be made of rutile or calcite, and that the Faraday rotator be made of YIG or paramagnetic glass.

I claim:

1. A device comprising:
   a compensator which includes a half-wave plate and a quarter-wave plate arranged in a predetermined order with respect to a beam of plane-polarized incident light, the respective orientations of the principal axes of said plates with respect to the plane of polarization of said incident light being $\theta/2$ and $\theta$, said incident light being incident first on said half-wave plate, and
   a rotator arranged in combination with said compensator, after said compensator with respect to said incident light, said rotator rotating the light passing therethrough by an amount that depends on wavelength, wherein $\theta$ is provided at an optimum angle to compensate the wavelength dependency of said rotator in the predetermined wavelength region, thus a plane-polarized output beam is provided from said compensator with a rotation of the plane of polarization from that of said incident light that depends on wavelength, and the rotation of the plane of polarization of said incident light, by the combination of said compensator and rotator, becomes independent of wavelength.

2. A device comprising
   a compensator which includes a half-wave plate and a quarter-wave plate arranged in a predetermined order with respect to a beam of plane-polarized incident light, the respective orientations of the principal axes of said plates with respect to the plane of polarization of said incident light being 0 and $\theta/2$, said incident light being incident first on said quarter-wave plate, and
   a rotator arranged in a combination with said compensator, before said compensator with respect to said incident light, said rotator rotating the light passing therethrough by an amount that depends on wavelength,
   wherein a plane-polarized output beam is provided from said compensator with a rotation of the plane of polarization from that of said incident light that depends on wavelength in accordance with each value for $\theta$, and the rotation of the plane of polarization of said incident light, by the combination of said compensator and rotator, becomes independent of wavelength.

3. The device of claim 1 or 2, comprising
   a pair of birefringent wedges arranged with said compensator and rotator therebetween,
   wherein respective refractions of said incident light by said pair of birefringent wedges cancel each other so that beams corresponding to ordinary and extraordinary rays of said incident light in each of said birefringent wedges are output in parallel, whereas respective refractions of said rays of light travelling in a direction opposite to said incident light do not cancel and are output in different directions.

4. The device of claim 3, comprising a pair of lenses combined with the combination of said compensator, rotator and wedges therebetween,
   wherein said rays corresponding to said incident light are focussed to the same point in the light corresponding to said incident light that is output from the combination including said lenses, whereas the respective rays of the light travelling in said opposite direction from said incident light are focused at different respective points by said combination including said lenses.

5. The device of claim 3, wherein the wedges are of rutile or calcite.

6. The device of claim 1 or 2, said rotator being a Faraday rotator.

7. The device of claim 1 or 2, wherein said quarter-wave and half-wave plates are made of single-crystalline quartz.

8. The device of claim 1 or 2, wherein the thickness of said compensator is in the range from 30 to 100 microns.

9. The device of claim 1 or 2, wherein the diameter of said compensator is in the range from 3 to 5 mm.

10. The device of claim 1 or 2, wherein the dependency of said rotation provided by said compensator to said plane-polarized incident light is over a range including 1.3 to 1.5 microns.

11. The device of claim 10, wherein the change of said rotation provided by said compensator is proportional to deviation of the wavelength from 1.4 microns.

* * * * *

UNITED STATES PATENT AND TRADEMARK OFFICE
CERTIFICATE OF CORRECTION

PATENT NO. : 4,712,880

DATED : December 15, 1987

INVENTOR(S) : Masataka Shirasaki

It is certified that error appears in the above-identified patent and that said Letters Patent is hereby corrected as shown below:

Col. 1, line 15, delete "and" (second occurrence);
      line 32, "compensator" should be --compensators--.

Col. 3, line 5, "axix" should be --axis--.

Col. 6, line, 34, "focussed" should be --focused--.

Signed and Sealed this

Twelfth Day of July, 1988

*Attest:*

DONALD J. QUIGG

*Attesting Officer*      *Commissioner of Patents and Trademarks*